Nov. 9, 1943.          C. R. WHITAKER          2,333,757
                          CARRIER
              Filed May 16, 1940          2 Sheets-Sheet 1
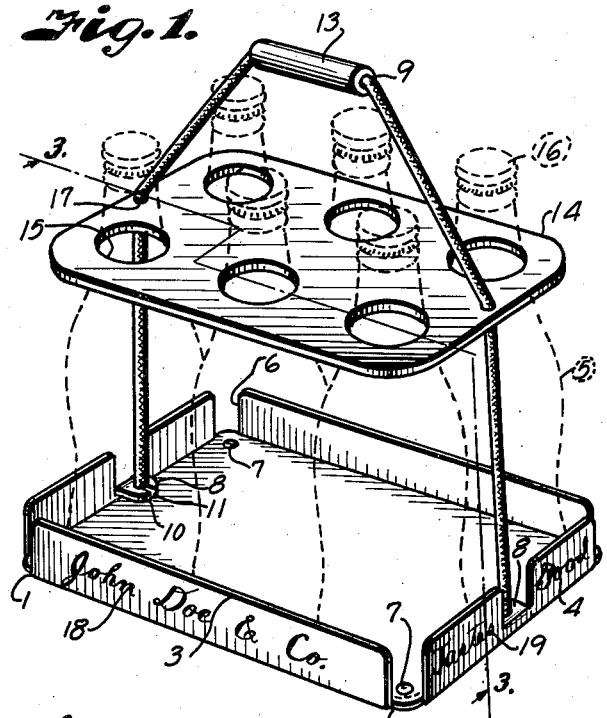
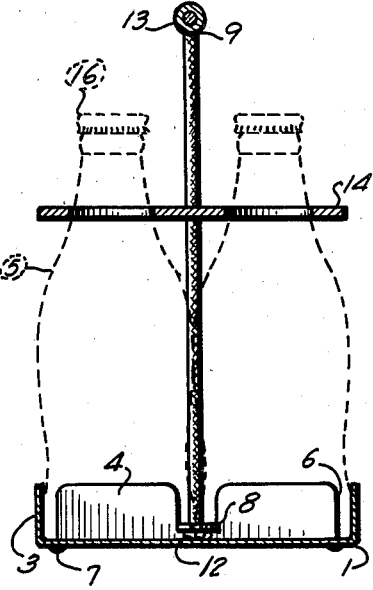
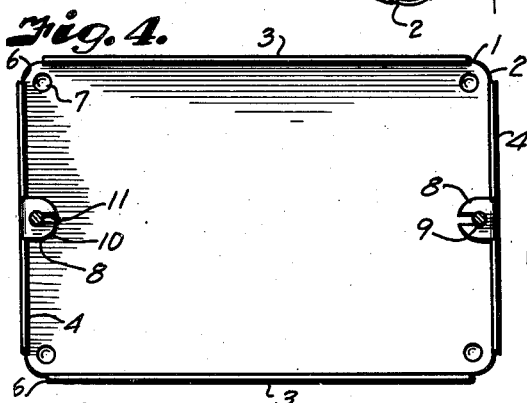
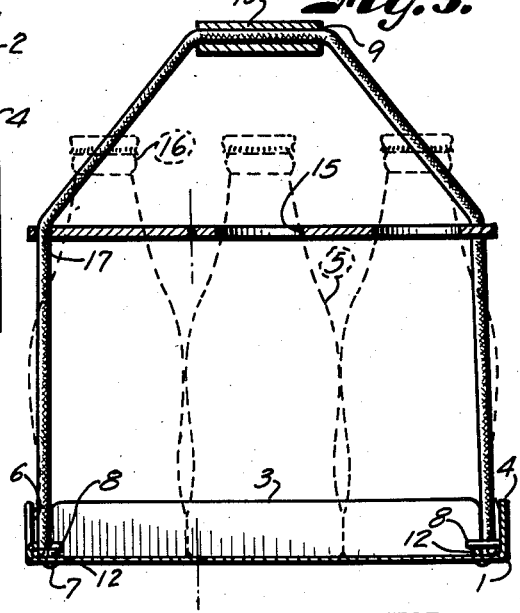
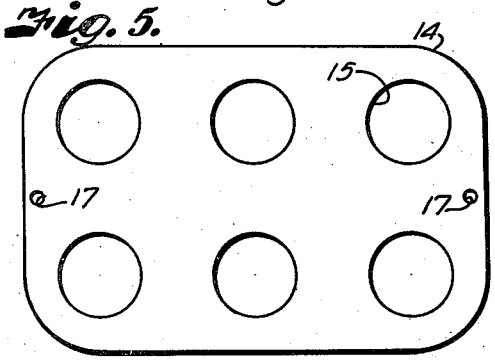
INVENTOR
Charles R Whitaker
BY
ATTORNEY Nov. 9, 1943.  C. R. WHITAKER  2,333,757
CARRIER
Filed May 16, 1940  2 Sheets-Sheet 2

INVENTOR
Charles R. Whitaker
BY
ATTORNEY

Patented Nov. 9, 1943

2,333,757

UNITED STATES PATENT OFFICE 2,333,757

CARRIER

Charles R. Whitaker, Kansas City, Mo.

Application May 16, 1940, Serial No. 335,531

1 Claim. (Cl. 224—48)

This invention relates to carriers and more particularly to bottle carriers suitable for transporting bottled or similarly packaged soft and like beverages, the principal objects of the present invention being to provide a convenient, economical and efficient carrier of the character and for the purpose noted.

Other objects of the invention are to provide a bottle carrier that is capable of displaying substantially the entire bottle or bottles carried thereby; to provide a bottle carrier that is cooperative with other similar bottles and carriers therefor in such a manner as to facilitate stacking and displaying a plurality of groups of bottles and their contents; to prolong the life of bottle carriers embodying the features of this invention over other carriers for the same purpose heretofore available; to make the carriers suitable for reuse indefinitely and consequently effect substantial savings to bottling establishments and other handlers of bottled goods; to provide a bottle carrier that may be sterilized; to provide a bottle carrier that is resistant to deterioration normally resulting from exposure to water and the like; to facilitate applying and unloading filled and empty bottles relative to carriers of this character; and to provide for placing a loaded carrier in a cooler, whereby the handling of cooled beverages by merchants and consumers is facilitated.

In a bottling industry, bottles are sometimes packed in cases or "shells" adapted to hold twenty-four or more bottles. Other objects of the present invention are, therefore, to provide bottle carriers that are adapted to be arranged in a shell prior to placement of bottles therein without interfering with packing bottles in the shell or removing bottles from the shell; and to thus enable bottlers and similar handlers of such goods to remove empty bottles from the shell and refill the carriers and the shell with new stock without the necessity of removing the carriers from the shell.

Other objects of the invention are to facilitate shipping carriers embodying the features of this invention by rendering the carriers collapsible; and to facilitate packing carrier supported bottles in shells by retracting projecting parts of the carrier to an "out-of-the-way" position relative to the shell.

It is sometimes customary to provide bottle carrying shells with dividers to separate bottles carried therein. Other objects of the invention are, therefore, to provide bottle carriers that are adapted to be inverted and laid flat on top of bottles arranged in a conventional shell provided with a dividing liner; to eliminate the necessity of providing several types of shells; and to provide protection for the bottles in a shell when the carriers are inverted as suggested.

Other objects of the invention are to provide for making carriers of the character noted in various sizes suitable for carrying desired numbers of bottles of desired sizes; to provide for handling the carriers in a safe and satisfactory manner without detriment to the carrier; to provide for the display of advertising matter and other suitable intelligence, such as identification as to ownership, character of contents and the like; to eliminate injury to handlers of the carriers by suitable safety provisions such as by the elimination of sharp edges on the carriers; and to provide improved elements, together with arrangements of them, in a bottle carrier of the character and for the purposes noted.

In accomplishing these and other objects of the present invention, I have provided improved details of structure, the preferred forms of which are illustrated in the accompanying drawings, wherein:

Fig. 1 is a perspective view of a bottle carrier embodying features of the present invention, a suitable arrangement of bottles being shown in dotted lines.

Fig. 2 is a substantially central transverse vertical cross-section through the bottle carrier illustrated in Fig. 1.

Fig. 3 is a substantially central longitudinal vertical cross-section through the bottle carrier on the line 3—3, Fig. 1, showing an arrangement for related elements of the carrier.

Fig. 4 is a top plan view of the carrier tray, the handle connecting portions being shown in horizontal cross-section.

Fig. 5 is a plan view of a bottle separating and retaining device.

Figure 6:
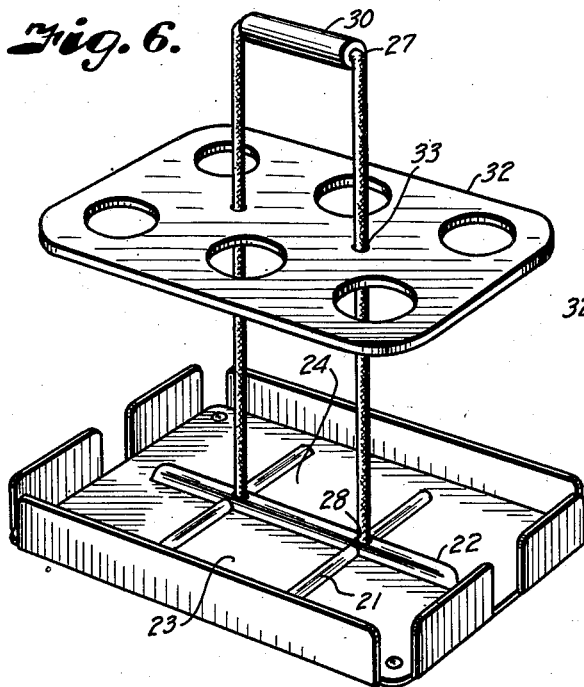
Fig. 6 is a modified form of bottle carrier embodying features of the present invention.
Figure 7:
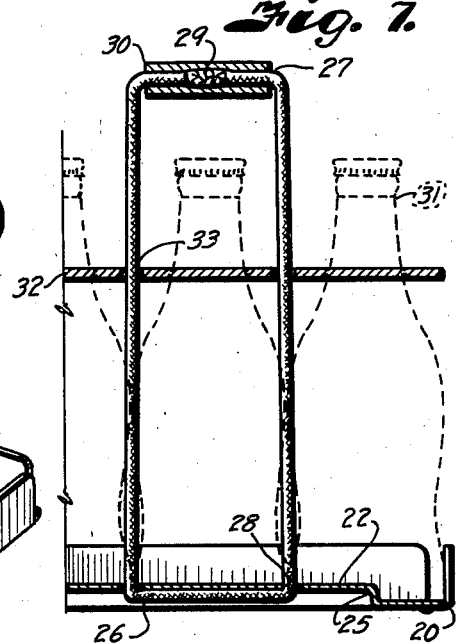
Fig. 7 is a fragmentary substantially central vertical cross-section through the bottle carrier illustrated in Fig. 6.

Referring more in detail to the drawings:

I designates the base member of a bottle carrier embodying the features of the present invention, which preferably consists of a plate of sheet metal, such as galvanized iron, the plate preferably being stamped to provide rounded corners 2, flanges 3 and 4 also being provided, which, when turned upwardly peripherally of the plate, form a retaining wall to hold bottles 5 or the like in desired position on the plate.

Cut-outs 6 are arranged preferably between the end flanges 4 and side flanges 3 to facilitate turning them upwardly and also to provide drainage outlets for the base member. Indentations 7 are also preferably provided in the plate adjacent the corners thereof to form bearings for the base member when placed on suitable supports, such as counters, floors, refrigerator cabinets and the like.

8 designates ears that are preferably stamped in the end flanges 4 of the base member and turned inwardly to form clips by which a handle member 9 is attached to the base member to facilitate handling the base member, particularly when filled with bottles 5. The clips 8 are preferably provided with rounded ends 10 and notches 11, which respectively prevent injury to operators applying the handle member and allow ready application of the handle member to the base member.

The handle member may consist of a flexible rope, cable, or the like having knotted ends 12, Fig. 3, arranged to underlie the clips, as shown, the intermediate portions of the rope, for example, being adapted to extend upwardly from opposite ends of the base member and have a suitable hand-hold device 13 mounted thereon to facilitate carrying a loaded base member.

Preferably slidably mounted on the handle member is a separator 14, Fig. 5, which preferably consists of a plate generally corresponding in shape to the base member plate and being formed of a suitable material that may be sterilized and resists disintegration. Certain types of ply-wood, some plastics, water resistant fibreboards and similar materials are suitable for this purpose, it being a desideratum to prevent noise from contact of the bottles with each other as well as contact of the bottles in one carrier with those in an adjacent carrier.

Openings 15 are provided in the separator which correspond in spacing and number to the bottles 5 on the base member and which are of a size suitable for passing the upper ends 16 of the bottles therethrough. Openings 17 are also preferably provided in the ends of the separator which correspond with the notches in the clips on the base member to align and center the separator relative to the base member.

Prior to assembly, the base member and particularly the outer faces of the flanges thereon, as well as the separator, may be provided with various forms of intelligence, such as an identification of ownership, advertisements and the like, as shown at 18 and 19.

The operation of a bottle carrier constructed and assembled as described, is as follows:

The separator is first slid upwardly on the handle member and moved to one side of the base member, whereupon bottles may be applied to the base member in numbers depending upon the size of the base member and openings for the upper ends thereof provided in the separator. The separator is then moved back into spaced vertical alignment with the base member and slid downwardly over the upper ends of the bottles, it being apparent that the upper ends of the bottles are thus separated and that they cannot rattle or bump against each other, nor can they be accidentally removed from the base member due to the cooperation between the base and separator members.

It is further apparent that the separator may be slid downwardly on the handle member to collapse the bottle carrier and render it convenient for shipping, storage and the like; also that the bottle carrier is adapted for sterilization, reuse, inversion over bottles already packed in a shell, and that it has many other advantages and is admirably suited for carrying out the objects of the invention above pointed out.

In Fig. 6, a modified form of the invention is shown, wherein the base member 20 is preferably of stamped sheet metal construction somewhat similar to the form of invention illustrated in Figs. 1 to 4, the exception in this instance being that ribs 21 and 22 are provided in the horizontally arranged base plate, preferably in crossed relation to define bottle carrying portions 23 and 24 in the base member. The ribs may be formed by indenting the base upwardly to also provide a bottom recess 25 longitudinally of the base member to receive a portion 26 of a handle member 27, the ends of which are passed through apertures 28 in the rib 22 and extended upwardly for joining, as at 29, in a hand-hold device 30 that facilitates handling the base member, particularly when loaded or filled with bottles 31.

A separator 32 substantially of the same character as the separator 14 is provided for separative engagement with the upper ends of the bottles 31, in this instance the separator having apertures 33 alignable with the apertures 28 in the base member by which the separator is slidably mounted on the handle member relative to the base member.

The operation and advantages of this form of the present invention are substantially similar to that of the form first described.

Figure 8:
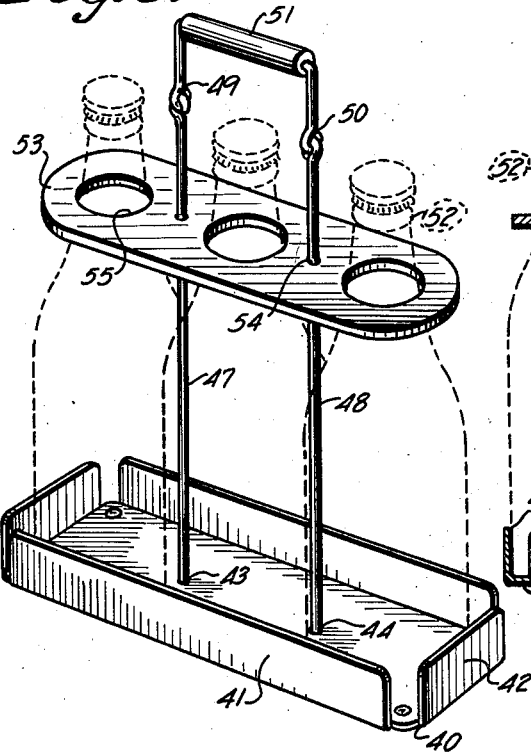
Fig. 8 is a perspective view of a further modified form of bottle carrier embodying features of the present invention.
Figure 9:
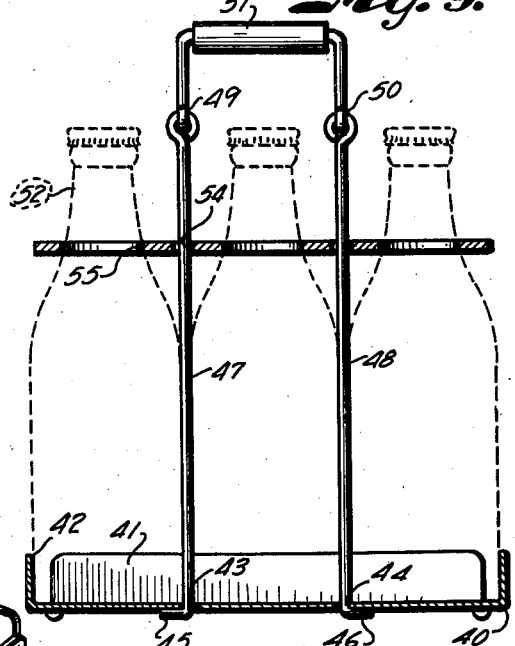
Fig. 9 is a vertical substantially central longitudinal cross-section through the bottle carrier illustrated in Fig. 8.

In the form of invention illustrated in Figs. 8 and 9, a base member 40 is provided consisting of a plate having side and end wall flanges 41 and 42 spaced to accommodate three bottles therebetween. Spaced apertures 43 and 44 are arranged substantially centrally in the base plate and through which pass preferably outwardly turned ends 45 and 46 of handle forming members 47 and 48, the handle forming members preferably being in the form of relatively rigid rods extending upwardly from the base and being provided with hinged portions 49 and 50, the intermediate portions of which are enclosed in a hand-hold sheath 51 to facilitate carrying the base member when filled with bottles 52.

In this form of invention also a separator 53 is provided that is slidably mounted on the handle forming members 47 and 48 as by means of apertures 54 in the separator, the separator being of suitable sheet material and having openings 55 therein for allowing the separator to engage about the upper ends of the bottles 52 and separate the same.

The operation and advantages of this form of the present invention are substantially similar to those of the forms above described, it being apparent that the hinged handle portions provide for substantially collapsing the carrier to allow a loaded carrier to be placed in a shell for storage or shipment, the separator being slidable upwardly and downwardly on the rods to facilitate storage of the carriers when unfilled.

It is apparent, therefore, that the present invention provides a convenient, economical and efficient bottle carrier adapted for carrying out the objects and having the advantages above set forth.

What I claim and desire to secure by Letters Patent is:

In a device of the character described, a base member adapted to primarily support a plurality of objects to be carried, a handle member, flexible members connecting the handle member with the base member, said flexible members being connected to the base member at spaced points, and means for separating said objects, said separating means being slidably mounted on said flexible members and having engagement therewith for spacing said flexible members, the distance between the points of engagement of the separating means with the flexible members being greater than the handle member to form an angle in the flexible member at said points of engagement, whereby tension applied to the flexible members for lifting the device applies downwardly directed forces on the separating means to hold said separating means in engagement with the objects being carried.

CHARLES R. WHITAKER.